April 14, 1953  E. OJALVO  2,634,758
MANUAL VALVE HAVING ADJUSTABLE VALVE-OPENING LIMIT MEANS
Filed July 16, 1949
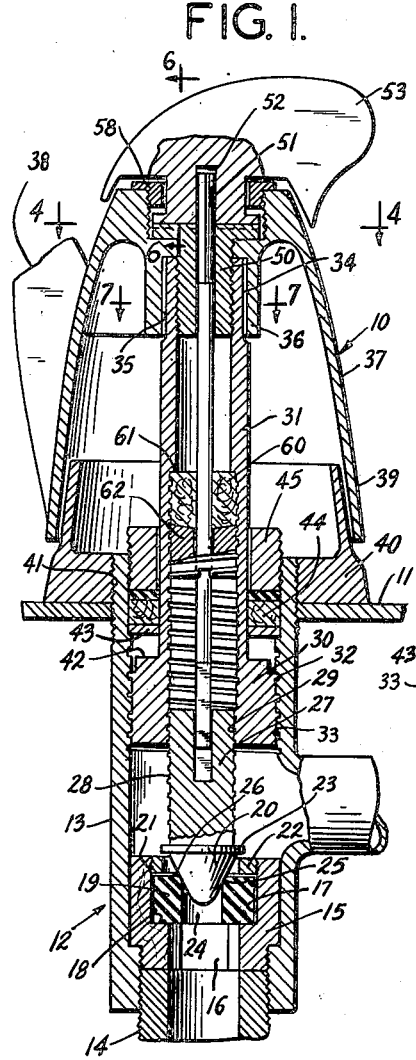
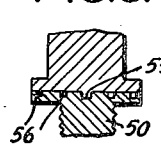
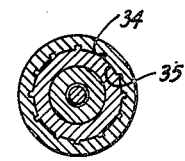
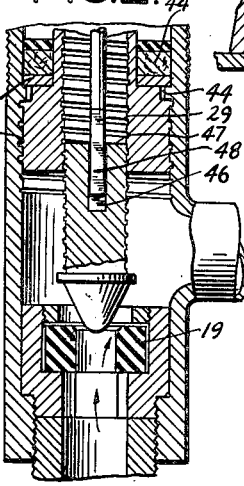
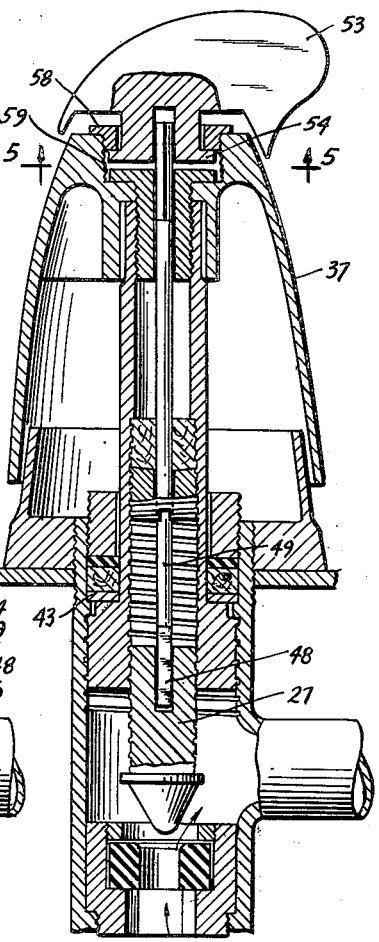
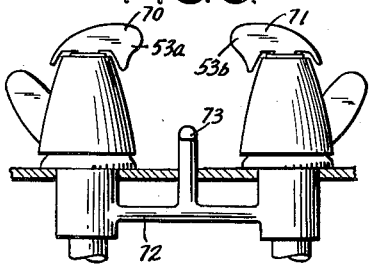
INVENTOR.
EDMOND OJALVO
BY
ATTORNEY.

Patented Apr. 14, 1953

2,634,758

UNITED STATES PATENT OFFICE 2,634,758

MANUAL VALVE HAVING ADJUSTABLE VALVE-OPENING LIMIT MEANS

Edmond Ojalvo, New York, N. Y.

Application July 16, 1949, Serial No. 105,128

3 Claims. (Cl. 137—756)

This invention relates to valve structures—particularly, although not exclusively, adapted for use with manually manipulable faucets and the like.

It is primarily within the contemplation of my invention to render it conveniently adaptable for that type of structure having a casing the base of which is provided with a centrally apertured inlet fitting constituting a seat for a vertically adjustable conical or similar valve. In conventional structures of this category, the valve member is rotatable together with the manually manipulatable handle, the valve being mounted on a threaded member which coacts with an internally threaded casing for effectuating the raising and lowering of the valve upon a turning of the handle. It has been found that because of the rotary engagement of the valve with the seat, there is a progressive wearing away of the valve or seat, or both. This not only makes it necessary to replace such worn out parts, with all the attendant inconveniences and cost, but also results in leakage of the water past the valve closure. In other words, the wearing away of such parts destroys the effectiveness of the seat as a water pipe closure, causing a slight water drip through the faucet. And it has also been observed, in conventional valves of the type above-mentioned, that where corrosion occurs, which is not uncommon in plumbing fittings of this category, the rotating engagement of the valve and seat at times causes an abrasion or tearing away of portions of the valve or seat—a condition which becomes serious when one of the members is made of rubber or other soft material.

It is accordingly one of the important objectives of my invention to provide a valve structure wherein effective leak-proof closures are obtained, in devices of the class described, by means which obviate the relative rotation of the valve member and the seat. And in this aspect of my invention it is an important object to employ a valve closure member, which may be of the conical type above-mentioned, which is adapted to be brought into firm engagement with the underlying seat without such relative movement, although the handle is rotated in conventional manner.

It is also an object of my invention to enable replaceable closure members to be employed in association with a seat, with a minimum of wear because of the operative engagement of the valve and washer.

Still another object of my invention is to provide simple adjusting means for selectively positioning the valve within the casing so that only an inlet area of predetermined magnitude will be presented, whereby a predetermined amount of water can be made to flow through the valve upon an operative turning of the handle to its full open position.

It is still a further object of my invention to provide a structure the basic elements of which can readily be applied to existing valve structures, where they may be reconditioned to embody the features of the present invention. And it is also within my contemplation to enable the structure of my invention to be embodied in a complete valve unit for installation in conjunction with conventional plumbing fixtures.

Still a further object of my invention is to provide a device wherein the adjustable elements are conveniently located for ready manual manipulation, and are nevertheless so positioned with respect to the main handle of the device as to constitute a presentable structure.

A further object is to enable my invention to be combinatively employed with a complementary similar unit whereby hot and cold water mixtures of predetermined temperatures may readily be obtained.

And still another object of my invention is to provide a device having the aforesaid features, and yet which is simple to operate and inexpensive to construct.

Other objects, features and advantages will appear from the drawings and the description hereinafter given.

Referring to the drawings,

Figure 1 is a vertical sectional view of a preferred form of my invention, the valve being shown in its closed position.

Figure 2 is a fragmentary view, substantially like Figure 1, but showing the valve in its open position.

Figure 3 is a view substantially like Figures 1 and 2, but showing the valve adjustably raised to an open position where the inlet opening is greater than that of Figure 2—the adjusting handle at the top of the device being shown in its raised position for adjusting the position of the closure valve member.

Figure 4 is a section of Figure 1 taken substantially along line 4—4.

Figure 5 is a section of Figure 3 taken substantially along line 5—5.

Figure 6 is a fragmentary vertical section of Figure 1 taken substantially along line 6—6 thereof.

Figure 7 is a section of Figure 1 taken substantially along line 7—7 thereof, and Figure 8 is an elevational view of two units of my invention connected together to form a hot and cold water mixing combination.

In the form of my invention illustrated, there is an upper manually manipulable portion generally designated 10, this being disposed above the sink top 11—the valve containing a lower body portion generally designated 12, being disposed below wall 11. The said portion 12 contains a tubular casing 13, the bottom of which is in threaded engagement with the water inlet pipe 14. Disposed within the bottom of tube 13 and adjacent the pipe 14 is the valve seat fitting 15 containing a passageway 16 communicating with an enlarged chamber 17 containing the annular shoulder 18 upon which rests the preferably rubber gasket 19 forming the seat for the operative valve terminal 20, as will more clearly hereinafter appear. The inner upper portion 21 of expanded chamber 17 of fitting 15 is threaded so as to receive the retainer ring 22 which is in threaded engagement with said threaded portion 21. The retainer ring is centrally apertured to receive therethrough the valve terminal 20, it being preferred that the apertured portion be greater than central aperture 24 of the washer 19, so as to permit said valve 20 to extend therethrough and engage the upper periphery 25 of apertured portion 24 of washer 19. It is also preferred that the retainer ring 22 and washer 19 be so disposed within chamber 17 as to provide a slight space 26 between the retainer ring and the washer—or at any rate to leave the washer 19 relatively free for rotary movement for reasons which will more clearly hereinafter appear.

The operative valve tip 20 is mounted upon an auxiliary valve stem 27 containing an outer threaded wall 28 in threaded engagement with the inner axial threaded wall 29 of the base 30 of the main valve stem 31. The outer surface 32 of base 30 is in threaded engagement with the inner threaded wall 33 of casing 13. The arrangement is hence such that upon an operative rotary movement of auxiliary valve stem 27, said latter stem will move longitudinally with respect to main valve stem 31; and an operative rotatable movement of main stem 31 will cause said stem to move longitudinally with reference to casing 13.

When auxiliary valve stem 27 is operatively rotated (in a manner to be hereinafter set forth), the bottom tip 20 thereof can be moved to and from engagement with the valve seat washer 19, either to open or close the passageway past the valve. For example, Figure 1 shows the valve in its closed position, and Figures 2 and 3 show the valve in two differently adjusted open positions—the position of Figure 3 indicating a greater valve opening than that of Figure 2.

The upper portion 34 of main stem 31 is splined, and is in engagement with the splined inner surface 35 of the internal hub 36 of the handle cap 37 to which is secured the manually manipulable handle or finger engaging portion 38. The lower portion 39 of the lateral apron constituting the cap 37 is in overlapping relation to the ring fitting 40, the centrally apertured portion 41 being in threaded engagement with the outer surface of the upper portion of tubular casing 13—said fitting 40 resting upon the wall 11. It is thus apparent that upon a rotary manipulation of member 37, the main valve stem 31 will be correspondingly rotated whereupon the base 30 thereof will ride up or down upon the threaded internal portion 33 of casing 13; thereby causing either an upward or downward movement of the main valve stem 31 and the valve member 27 supported thereby.

The upper limit of movement occurs when the upper annular shoulder 42 of base 30 engages the centrally apertured disc 43 supporting the packing material 44. The said disc 43 is supported by the upper thread 44 on the internal annular wall of casing 13; and the said packing material 44 is held in compressed condition by the packing ring 45 in threaded engagement with the inner upper portion of casing 13.

The auxiliary valve member 27 contains the slotted portion 46 extending downwardly from its upper surface 47; and extending into such slotted portion is the square shank 48 of the adjusting rod 49 extending upwardly through hollow valve stem 31 and through the centrally apertured threaded bushing 50 which is in threaded engagement with the upper portion of valve stem 31. The rod 49 has an upper portion 51 of square cross section, this portion extending into the square cross section recess 52 of the adjusting handle 53.

Said adjusting handle 53 contains on the under surface of the flange 54 thereof a diametral rib 55 which is adapted to fit into any one of the radial recesses 56 on the upper surface 57 of the said bushing 50. A retainer ring 58 threaded into the upper recessed portion 59 of cap 37 serves to engage the upper portion of said flange 54 for holding it against detachment. The arrangement is such that when the rib 55 is in one of said grooves 56, the adjusting handle 53 will be locked against rotation, as indicated in Figure 1. However, when the adjusting handle 53 is slightly raised to the position shown in Figure 3, the rib 54 is clear of recesses 56; and accordingly the adjusting handle 53 can be rotated. Such a rotation will be transmitted through rod 49 to the auxiliary valve member 27, causing it operatively to be raised or lowered. It will be further noted that the internal portion of main valve stem 31 contains packing 60 held against shoulder 61 by the packing ring 62 in threaded engagement with the threaded wall 29 of said stem 31.

In the operation of this device, it is first necessary operatively to raise the main stem 31 so that the shoulder 42 of its base will be in abutment with disc 43. Thereafter, by manipulating the adjusting handle 53, the valve tip 20 is brought to the desired open position, such as in Figure 2 or in Figure 3. Thereafter, when the handle member 53 is dropped to the position shown in Figure 1, the valve is set to operate in accordance with the desired adjustment for water flow. Merely by operatively grasping main handle 38 and turning the cap 37, the valve will be opened and closed. In the closed position it will be as indicated in Figure 1; and in the opened position it will either be as indicated in Figures 2 or 3, or in any other set position.

If two such valves 70 and 71 (Figure 8) are employed together with a joined pipe 72, and a common outlet 73—and if valve 70 were for hot water and valve 71 for cold water, it is apparent that predetermined water temperatures could be readily obtained. And all that need be done to effect a change in the temperature is to raise one or both of the adjusting handles 53a and 53b, to regulate the position of the valve tip 20 in accordance with the desired proportions of hot and cold water. And once such adjustment is made, the final water temperature will have been determined and will remain unaltered until deliberately changed by the adjusting mechanism provided.

It is most important to observe that with the mechanism above-described, valve element 20 comes into its final seated position on washer 19 without any undue turning engagement with the seat. This is due to the fact that closure is obtained at the instant of contact with periphery 25, upon an operative lowering of main valve stem 31. Any further rotation that would occur would also cause a rotation of washer 19, since it is disposed within chamber 17 so as to be capable of rotary movement, as aforesaid. Any simultaneous rotation of valve element 20 with seat element 19 will obviously not produce a wearing on the seating periphery 25.

In the above description, the invention has been disclosed merely by way of example and in preferred manner; but obviously many variations and modifications may be made therein which will still be comprised within its spirit. It is to be understood, therefore, that the invention is not limited to any specific form or manner of practicing same, except insofar as such limitations are specified in the appended claims.

I claim:

1. In a valve structure, a main valve stem, an auxiliary stem in threaded engagement therewith, whereby upon an operative rotation of the auxiliary stem it will move longitudinally relative to the main stem, a valve terminal element at the lower extremity of the auxiliary stem, a centrally apertured valve seat in the path of said valve element and engageable therewith, a support for said seat comprising a fitting having a central inlet passageway having an enlarged chamber at one end containing said seat, the seat being loosely mounted in said enlarged chamber, whereby it will be free to rotate with the valve element when operatively engaged thereby, a seat retainer ring disposed within said chamber and spaced above the valve seat, a casing containing therein said support and seat, the main stem being in threaded engagement with the casing, whereby upon an operative rotation of the main stem it will move longitudinally relative to the casing, and the said valve element will move longitudinally relative to the seat, and stop means to limit the operative movement of the main stem in the direction away from the seat, whereby the total operative movement of valve element, for a given setting of the auxiliary stem relative to the main stem, will be limited by said stop means and said valve seat.

2. In a valve structure, a main valve stem, an auxiliary stem in threaded engagement therewith, whereby upon an operative rotation of the auxiliary stem it will move longitudinally relative to the main stem, a valve terminal element at the lower extremity of the auxiliary stem, a valve seat in the path of said valve element and engageable therewith, a casing containing therein said seat, the main stem being in threaded engagement with the casing, whereby upon an operative rotation of the main stem it will move longitudinally relative to the casing and the said valve element will move longitudinally relative to the seat, and stop means to limit the operative movement of the main valve stem in the direction away from the seat, whereby the total operative movement of the valve element, for a given setting of the auxiliary stem relative to the main stem, will be limited by said stop means and said valve seat, further provided with a main handle fixedly secured to the main valve stem, a regulating handle rotatably disposed at the upper portion of the main handle, an axial aperture of polygonal cross-section extending upwardly from the base of the regulating handle, a rod operatively connected to the auxiliary stem and having its upper portion of polygonal cross-section proportioned for slidable engagement with the sides forming said axial aperture, and locking means on the main handle and engageable with the regulating handle for holding the latter against rotation, said regulating handle being slidable on said rod to a position where the regulating handle is out of engagement with the said locking means, whereby the regulating handle will be free to rotate and actuate the rod and the connected auxiliary stem.

3. In a valve structure, a main valve stem, an auxiliary stem in threaded engagement therewith, whereby upon an operative rotation of the auxiliary stem it will move longitudinally relative to the main stem, a valve terminal element at the lower extremity of the auxiliary stem, a valve seat in the path of said valve element and engageable therewith, a casing containing therein said seat, the main stem being in threaded engagement with the casing, whereby upon an operative rotation of the main stem it will move longitudinally relative to the casing and the said valve element will move longitudinally relative to the seat, and stop means to limit the operative movement of the main valve stem in the direction away from the seat, whereby the total operative movement of the valve element, for a given setting of the auxiliary stem relative to the main stem, will be limited by said stop means and said valve seat, further provided with a main handle fixedly secured to the main valve stem, and having a recessed top portion therein, a regulating handle having a flanged base disposed within the said recessed portion, a locking member within said recessed top portion and underlying said flanged base, an axial aperture of polygonal cross-section extending upwardly from the flanged base, a rod operatively connected to the auxiliary stem and having its upper portion of polygonal cross-section proportioned for slidable engagement with the sides forming said axial aperture, said locking member and flanged base being in interlocking engagement for holding the regulating handle against rotation, said regulating handle being slidable on said rod to a position where the regulating handle is out of engagement with the said locking member, whereby the regulating handle will be free to rotate and actuate the rod and the connected auxiliary stem.

EDMOND OJALVO.

References Cited in the file of this patent

UNITED STATES PATENTS

| Number | Name | Date |
|---|---|---|
| Re. 17,022 | Wilson | July 3, 1928 |
| 750,881 | Morris | Feb. 2, 1904 |
| 915,321 | White | Mar. 16, 1909 |
| 1,087,001 | Dujat | Feb. 10, 1914 |
| 1,200,676 | Wiley | Oct. 10, 1916 |
| 1,324,196 | Kellum | Dec. 9, 1919 |
| 1,886,159 | Brown | Nov. 1, 1932 |
| 2,059,370 | Lane | Nov. 3, 1936 |
| 2,060,748 | Roberts | Nov. 10, 1936 |
| 2,114,934 | Nordstrom | Apr. 19, 1938 |
| 2,330,610 | Nater | Sept. 28, 1943 |
| 2,366,520 | Griffith | Jan. 2, 1945 |